United States Patent
Wang

(10) Patent No.: US 7,700,023 B2
(45) Date of Patent: Apr. 20, 2010

(54) METHOD FOR PRODUCING AN ENVIRONMENT PROTECTIVE FOAMED THERMOPLASTIC RESIN POLYMER

(76) Inventor: Shui-Mu Wang, No. 208-20, Jhongcing Rd., Situn District, Taichung City (TW) 407

( * ) Notice: Subject to any disclaimer, the term of this patent is extended or adjusted under 35 U.S.C. 154(b) by 680 days.

(21) Appl. No.: 11/599,614

(22) Filed: Nov. 15, 2006

(65) Prior Publication Data
US 2008/0114085 A1    May 15, 2008

(51) Int. Cl.
*B29C 47/60* (2006.01)
*C08G 18/00* (2006.01)

(52) U.S. Cl. ............... 264/211.21; 264/209.8; 264/177.14; 264/177.2; 264/211; 521/59; 521/60; 425/114; 425/131.1; 525/53; 525/54

(58) Field of Classification Search ............... 264/209.8, 264/177.14, 177.2, 211, 211.21, 211.23; 521/59, 60; 425/114, 131.1; 525/53, 54
See application file for complete search history.

(56) References Cited

U.S. PATENT DOCUMENTS
5,889,064 A * 3/1999 Herrmann ............... 521/82
2001/0044477 A1 * 11/2001 Soane et al. ............... 521/60

* cited by examiner

*Primary Examiner*—Milton I Cano
*Assistant Examiner*—Michael Leonard
(74) *Attorney, Agent, or Firm*—Banger Shia

(57) ABSTRACT

A method for producing an environment protective foamed thermoplastic resin polymer comprises using an extruder with a helical rod to be driven to rotate. The extruder has a feeding section, a melting section, a mixing section and a heating-shaping section formed therein. The method includes a plurality of steps, in which thermoplastic resin is heated, melted in the melting section and moved into the mixing section, and hollow expansion balls are fed into the extruder to be evenly mixed with the melted thermoplastic resin. Then the hollow expansion balls are slightly heated and inflated, and moved into the heating-shaping section, and then the balls are heated at foaming temperature, foamed and inflated. After being injected through a nozzle, the melted thermoplastic resin and the hollow balls become a foamed thermoplastic resin polymer with a preset thickness and shape.

11 Claims, 6 Drawing Sheets feeding thermoplastic resin in the extruder through a material intake.

↓ heating and melting the thermoplastic resin.

↓ feeding hollow expansion balls in the extruder through a material-feeding hole to be mixed with the melted thermoplastic resin.

↓ the filter screen producing back pressure toward the mixing section to let the melted thermoplasticu resin and the softened hollow expansion balls mixed more evenly.

↓ the melted thermoplastic resin and the softened and micro-foamed hollow expansion balls moved into a heating-shaping section, controlling the foaming rate of the hollow expansion balls and then having the hollow expansion balls pass through a shaping nozzle to be shaped into a foamed environment protective thermoplastic resin polymer.

FIG. 3

METHOD FOR PRODUCING AN ENVIRONMENT PROTECTIVE FOAMED THERMOPLASTIC RESIN POLYMER

FIELD OF THE INVENTION

This invention relates to a method for producing an environment protective foamed thermoplastic resin polymer, and more particularly to one having hollow expansion balls added into the interior of an extruder to be mixed and foamed with melted thermoplastic resin therein for producing a foamed thermoplastic resin polymer.

DESCRIPTION OF THE PRIOR ART

A conventional extruder 10 for producing a foamed polymer is provided with a motor 11 for driving a speedchange gear 12 to actuate a helical rod 13 to rotate. The extruder 10 has an upper feeding member 14 provided on a front portion thereof for supplying thermoplastic resin and heaters 15 disposed on opposite sides thereof respectively. The upper feeding member 14 has a mixing section 16 connected to a rear side thereof for heating and mixing the thermoplastic resin. The extruder 10 has a lower feeding member 17 provided on an intermediate portion thereof for feeding hollow balls into the interior of the extruder 10. Then, the helical rod 13 is driven to rotate for stirring and mixing the thermoplastic resin and the hollow balls together in the extruder 10, and finally the mixture of the thermoplastic resin and the hollow balls is extruded out through a shaping nozzle 18 and shaped into a foamed thermoplastic resin polymer. In addition, two ventilation holes 19 are respectively provided between the lower-feeding member 17 and the mixing section 16 as well as the shaping nozzle 18 for exhausting gas produced in the extruder 10 for producing a thermoplastic resin foamed polymer with closed cells and comparatively high hardness.

Another conventional extruder 20 for producing a foamed polymer, as disclosed in U.S. Pat. No. 5,889,064, titled "PROCESS AND APPARATUS FOR PRODUCING A FOAMED POLYMER", as shown in FIG. 2, is provided with a motor 21 for driving a helical rod 22 to rotate. The extruder 20 has a feeding section 23 provided on a front end thereof, and the feeding section 23 has a material intake 231 bored on an upper side thereof for feeding thermoplastic resin into the interior of the extruder 20. The feeding section 23 has a melting section 24 connected on a rear end thereof, and the melting section 24 has heating tubes 241 respectively installed on two opposite sides thereof for heating the thermoplastic resin in the melting section 24. A mixing section 25 is connected with the melting section 24, and a foaming agent feeder 251 is disposed above the connected portion of the melting section 24 and the mixing section 25 for feeding carbon-dioxide foaming agent into the extruder 20 to be mixed with the thermoplastic resin therein. Then, a cooling section 26 for cooling the thermoplastic resin is connected with the mixing section 25, and a shaping section 27 provided with a shaping device 271 is connected with the cooling section 26. After being cooled and hardened, the foamed thermoplastic resin polymer is pulled outward through the shaping device 271. Since the thermoplastic resin is foamed and shaped by using carbon-dioxide foaming agent and no exhaust hole is provided for exhausting gas which is produced in the extruder 20, the finished thermoplastic resin polymer is formed with open cells and has water absorption.

However, the first conventional extruder 10 is provided with the lower feeding member 17 for feeding hollow balls that are made of glass, non-foaming material. Then, the thermoplastic resin is mixed with the hollow balls, wrapping around the outer circumferences of the hollow balls for lessening the weight of the thermoplastic resin polymer. Therefore, the thermoplastic resin polymer produced through foresaid process is formed by mixing two or more materials with different physical properties. Thus, when inferior or broken foamed products have to be eliminated or replaced, it is impossible to have them directly smashed and recycled to be used again unless the hollow glass balls are separated apart from the thermoplastic resin in advance. In addition, the lower feeding member 17 is positioned at an intermediate portion of the extruder 10; therefore, after the hollow balls are added into the extruder 10 through the lower feeding member 17, there is a long stroke for the helical rods 13 to stir and mix the hollow balls, thus cutting and breaking the hollow balls to affect the quality of a thermoplastic resin polymer.

In addition, the second conventional extruder 20 uses carbon-dioxide foaming agent to be mixed with thermoplastic resin to produce a thermoplastic resin foamed polymer formed with open cells and having softness and water absorbability. However, in a producing process, a great quantity of carbon-dioxide forming agent has to be used and the extruder 20 is formed with a closed space for preventing the gas of the carbon-dioxide foaming agent from leaking out, but some of the carbon dioxide gas may leak out through certain part of the extruder 20, likely to jeopardize the health of workers working at the spot if they breathe too much harmful gas. Furthermore, when such a thermoplastic resin foamed polymer is finished and used, the gas of the carbon-dioxide foaming agent will release and spread in the air, not only influencing the workers' health but also polluting the air. Furthermore, in a foaming process, once the gas of the carbon-dioxide foaming agent meets with heat, hot air will move upward; therefore, the upper and the lower layer of foamed polymer produced by such gasiform foaming agent cannot be foamed evenly in density. As a result, the upper layer of the foamed polymer is comparatively loose while the lower layer is comparatively close in structure.

SUMMARY OF THE INVENTION

The objective of the invention is to provide a method for producing an environment protective foamed thermoplastic resin polymer, using an extruder having a helical rod installed in interior thereof and having a feeding section, a melting section, a mixing section and a heating-shaping section formed therein. The method includes a plurality of steps, in which after thermoplastic resin is heated and melted in the melting section and then moved into the mixing section, hollow expansion balls preset in proportion are added into the mixing section to be mixed with the melted thermoplastic resin. Then the hollow expansion balls are slightly heated, inflated and moved into the heating-shaping section, the hollow expansion balls are heated at comparatively high temperature to be foamed and inflated at a preset rate. After being injected through a nozzle to a preset shape as a board or bar, the melted thermoplastic resin and the expanded hollow expansion balls will make up a foamed thermoplastic resin polymer with a preset thickness and shape. Such producing method can effectively reduce the foaming heat loss and precisely control the foaming density of the hollow expansion balls. In addition, the hollow expansion balls are made of the same material as the thermoplastic resin; therefore, foamed thermoplastic resin products can be recycled and smashed into regenerated material, having environmental protection and reclamation.

BRIEF DESCRIPTION OF DRAWINGS

This invention will be better understood by referring to the accompanying drawings, wherein:

FIG. 3 is a block diagram of a producing process of an environment protective thermoplastic resin foamed polymer in the present invention;

DETAILED DESCRIPTION OF THE PREFERRED EMBODIMENT

Figure 1:
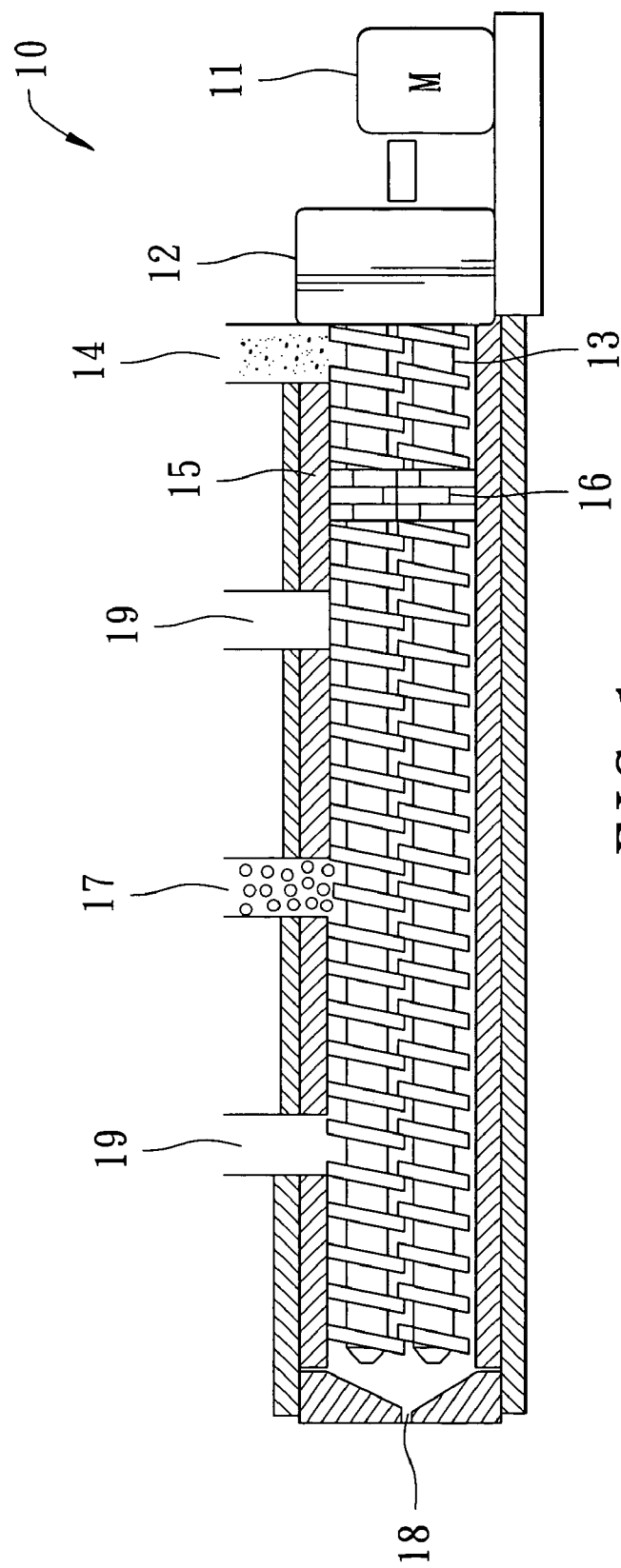
FIG. 1 is a side cross-sectional view of a conventional extruder.
Figure 2:
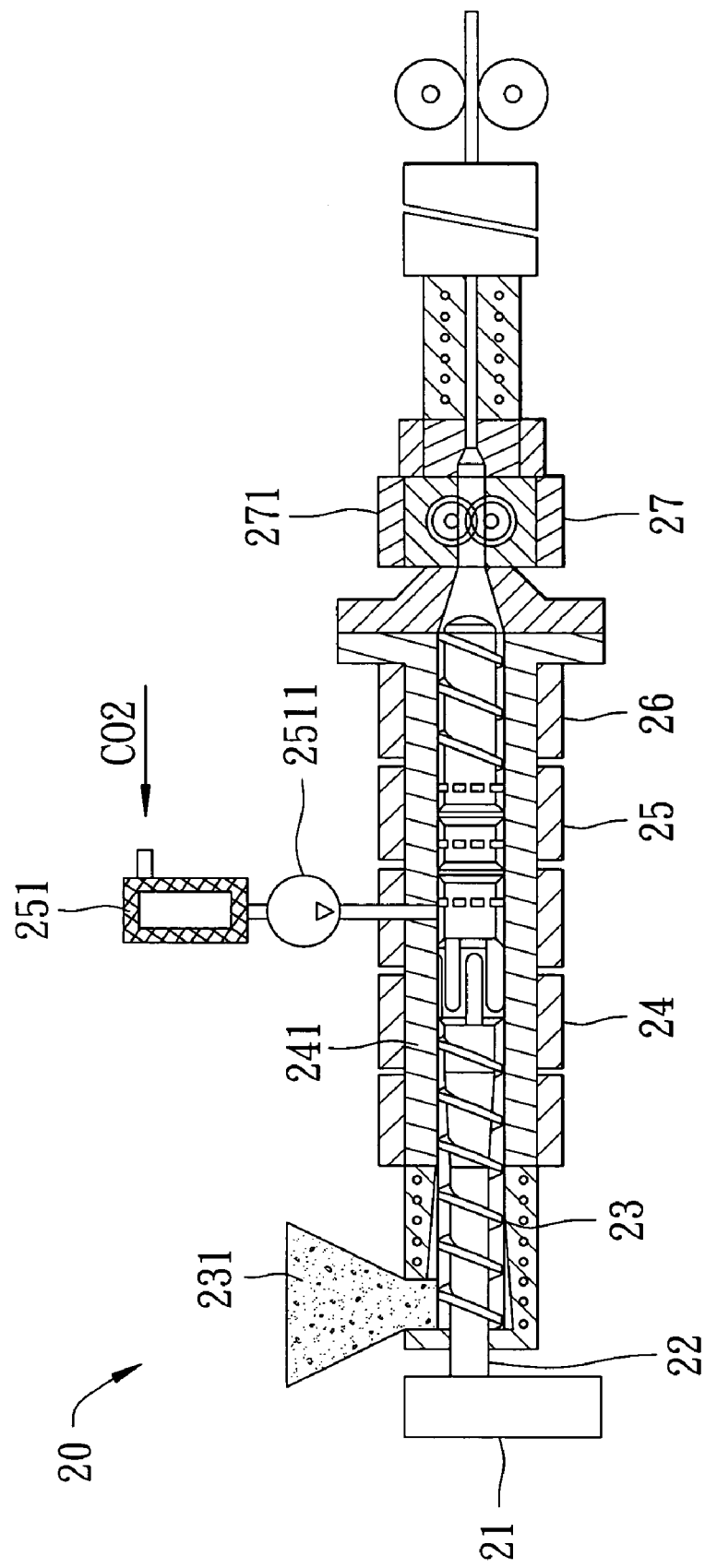
FIG. 2 is a side cross-sectional view of another conventional extruder.
Figure 4:
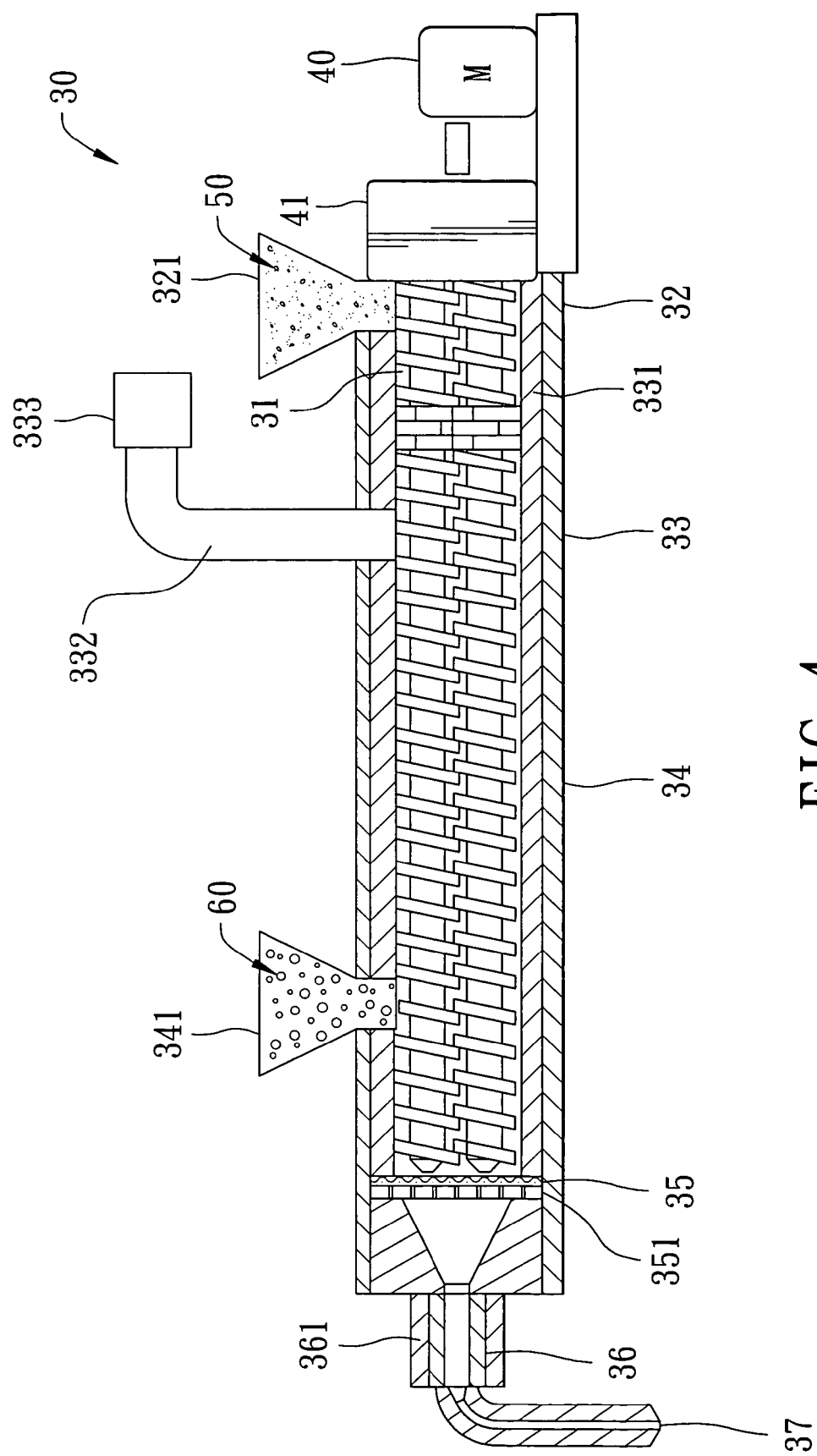
FIG. 4 is a side cross-sectional view of an extruder in the present invention.

A preferred embodiment of a method for producing an environment protective thermoplastic resin foamed polymer in the present invention, as shown in FIGS. 3 and 4, uses an extruder 30 provided with a motor 40 at one side thereof for driving a speed-change gear 41 to rotate and actuate a double-helical rod 31 pivoted axially with the speed-change gear 41 to rotate for feeding materials. The double-helical rod 31 is pivotally and transversely installed in the interior of the extruder 30. The method of producing a foamed thermoplastic resin polymer and the structure of the extruder 30 are described as follows.

Step 1: Thermoplastic resin 50 is fed into the extruder 30 through a material intake 321 provided above a feeding section 32 at the front end of the extruder 30.

Step 2: The thermoplastic resin 50 is then fed into a melting section 33 through the feeding section 32 to be heated and melted therein. The melting section 33 has heating members 331 disposed on a circumference thereof. When the double-helical rod 31 is rotated for feeding and stirring the thermoplastic resin 50, the melting point of the thermoplastic resin 50 is around 130° C.; therefore, the heating temperature of the heating members 331 is controlled to be around 130° C. to heat the thermoplastic resin 50 to be melted. In addition, an exhaust hole 332 and an air extractor 333 are provided above the melting section 33 so that when the thermoplastic resin 50 is heated and melted, the gas can quickly be exhausted out of the extruder 30 through the exhaust hole 332 and the air extractor 333.

Figure 5:
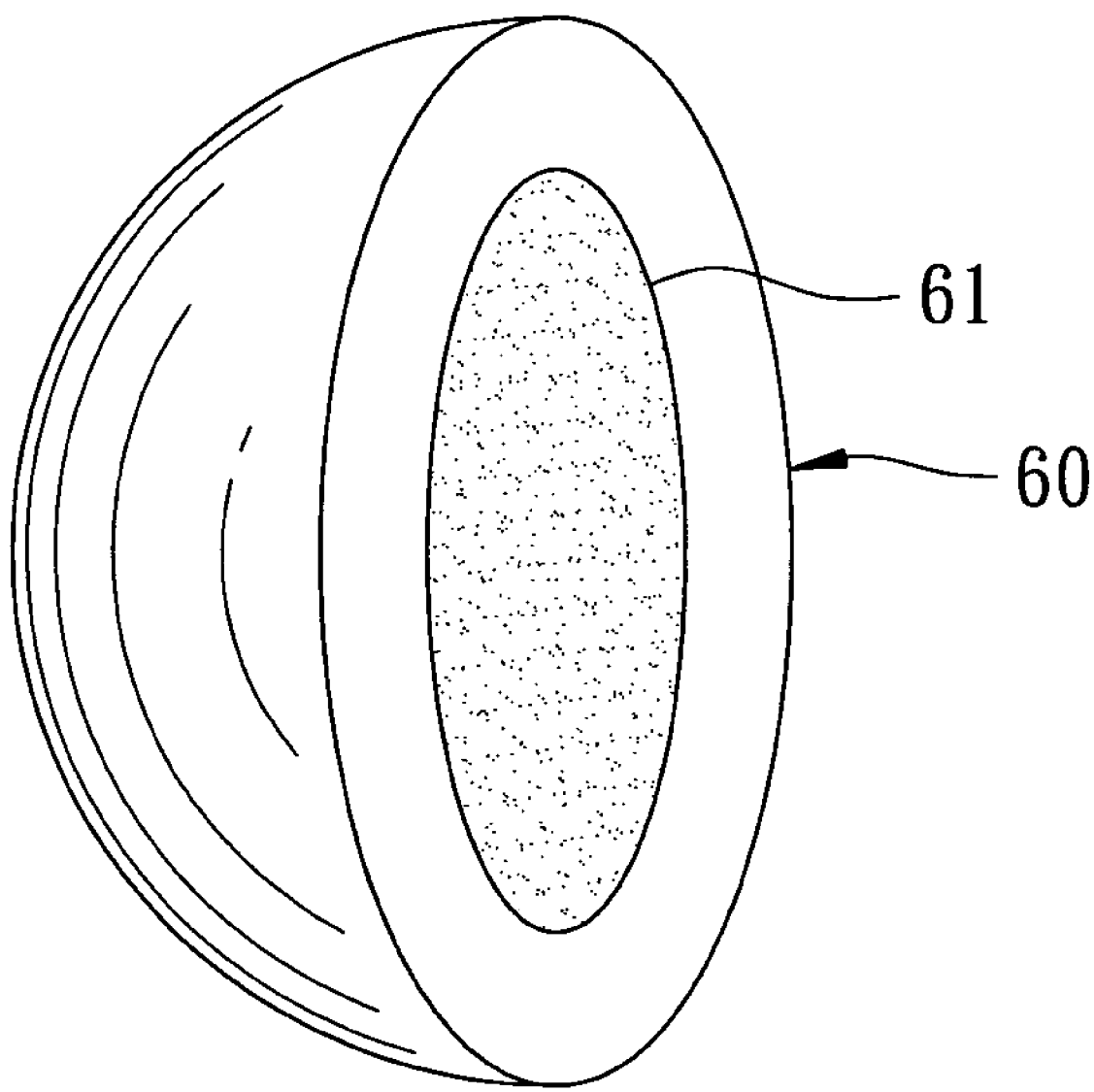
FIG. 5 is a cross-sectional view of a hollow expansion ball in the present invention.

Step 3: Hollow expansion balls 60 are added into the extruder 30 through a material feeding hole 341 positioned near the rear end of the extruder 30 and above the connecting portion of the melting section 33 and a mixing section 34 connected with the rear side of the melting section 33. Referring to FIG. 5, the hollow expansion ball 60 is a spherical body made of thermoplastic resin, formed with an outer diameter of 5-50 μm and having a core 61 formed in interior and composed of a compound of carbon and hydrogen. In addition, the thickness between the outer diameter of the hollow expansion ball 60 and the outer diameter of the core 61 is 2-12 μm, and the ratio between the thermoplastic resin 50 and the hollow expansion balls 60 is 8:2 or 9:1. When the double-helical rod 31 is rotated for feeding material, the thermoplastic resin 50 and the hollow expanded balls 60 will be stirred and mixed together. The melting point of the hollow expansion ball 60 is over 200° C. and the softening point thereof is around 130° C. and fully foaming and expanding point thereof is between 140° C. and 200° C. Therefore, when moving into the mixing section 34, the hollow expansion balls 60 are under a softened and microfoamed condition to be mixed with the thermoplastic resin 50.

Figure 6:
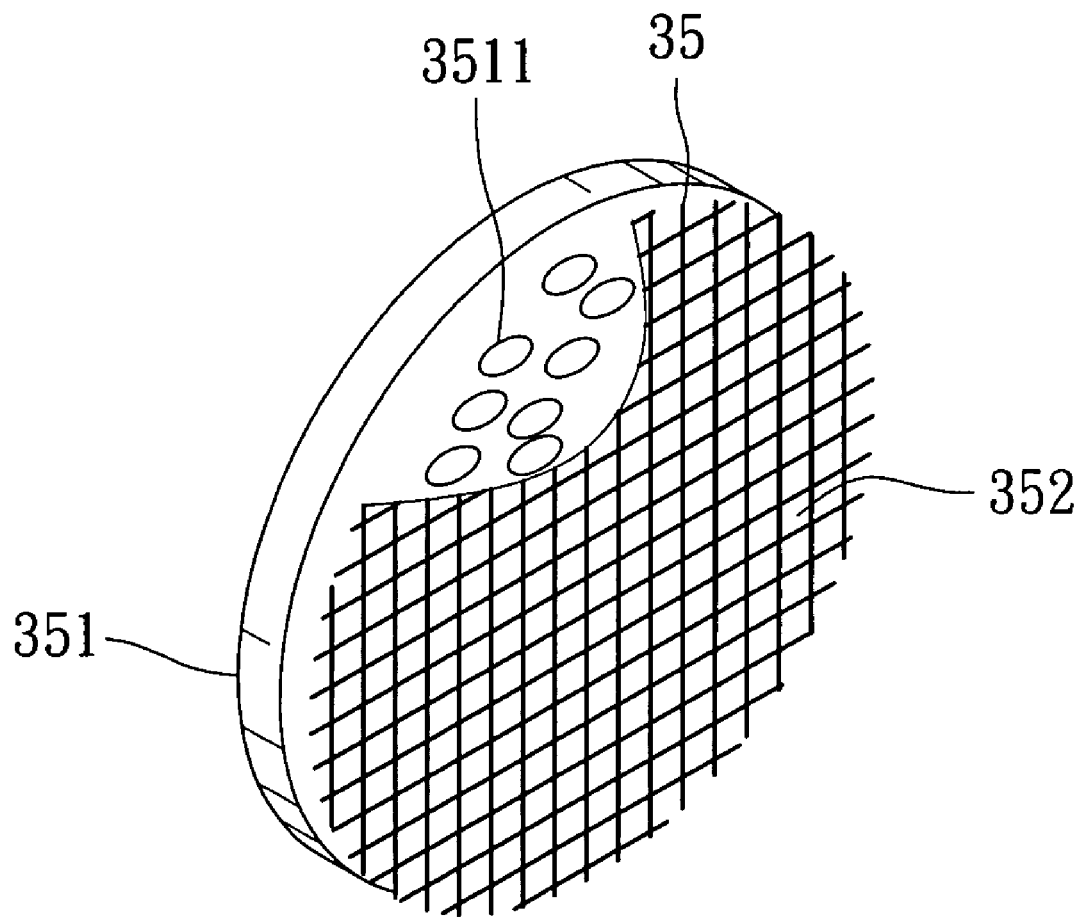
FIG. 6 is a perspective view of a filter screen in the present invention.

Step 4: Referring to FIG. 6, the melted thermoplastic resin 50 and the expanded and micro-foamed hollow expansion balls 60 are moved forward to pass through a filter screen 35 and a support plate 351 placed behind the filter screen 35. The filter screen 35 evenly formed with 20-200 meshes 352 is vertically provided at the rear end of the mixing section 34, and the support plate 351 evenly formed with small holes 3511, each having a size of 1.5-15 mm, is secured at the rear side of the filter screen 35 for the melted thermoplastic resin 50 and the softened and microfoamed hollow expansion balls 60 to pass therethrough. At this time, the fine meshes 352 of the filter screen 35 and small holes 3511 of the support plate 351 will restrict the flow amount of the melted thermoplastic resin 50 and the softened and micro-foamed hollow expansion balls 60 flowing through the filter screen 35, thus making them flow slowly within the mixing section 34, the filter screen 35 will produce a backward pressure toward the mixing section 35. Thus, the rotating double-helical rod 31 is able to fully stir the melted thermoplastic resin 50 and the softened and micro-foamed hollow expansion balls 60 to mix them evenly.

Step 5: After being mixed together, the melted thermoplastic resin 50 and the softened and micro-foamed hollow expansion balls 60 will be moved forward to pass through the filter screen 35 and the support plate 351 and then get into a heating-shaping section 36, which is installed with heating members 361 for producing preset heating temperature. At this time, the heating temperature of the heating-shaping section 36 for controlling the foaming and expanding rate of the hollow expansion balls 60 is between 140° C. and 200° C. The heating-shaping section 36 has a shaping nozzle 37 connected to a rear side thereof so that the basic material of foamed polymer formed by the foamed thermoplastic resin 50 and the hollow expansion balls 60 can be extruded to pass through the shaping nozzle 37, and after being cooled, the hollow expansion balls 60 are shaped into a foamed thermoplastic resin polymer with a preset thickness and shape.

Further, the exhaust hole 332 of the extruder 30 is used to exhaust gas produced in the extruder 30 for avoiding the foamed polymer producing open cells. Therefore, the thermoplastic resin foamed polymer produced is structured with closed cells. Furthermore, the thermoplastic resin foamed polymer can be shaped as a board or a bar, and the bar-shaped thermoplastic resin foamed polymer can be cut into grains.

Moreover, the thermoplastic resin foamed polymer can be applied for making shoe materials, sport apparatus and electronic products.

Additionally, before being fed into the extruder 30, the thermoplastic resin 50 or the hollow expansion balls 60 can be mixed with a preset proportion of metallic powder that has conductivity function so that the thermoplastic resin foamed polymer is shaped and then evenly spreads with the metallic powder and has resisting static electricity and conductivity, having great practicability in industry.

As can be understood from the above description, this invention has the following advantages.

1. The hollow expansion balls are added to the melted thermoplastic resin through different sections to be softened and micro-foamed first, and then the hollow expansion balls are heated with comparatively high temperature to be completely foamed and expanded up to a preset rate. In addition, the hollow expansion balls are added into the interior of the extruder at a location near the rear end of the extruder, effectively reducing the number of the hollow expansion balls cut or broken, greatly lowering the foaming heat loss of the hollow expansion balls and precisely controlling the foaming density of the hollow expansion balls to let them foamed and spread evenly.

2. The hollow expansion balls of this invention can be foamed and inflated up to 2-50 times in size; therefore, the thermoplastic resin foamed products are made from the thermoplastic resin and such hollow expansion balls are excellent in quality and light in weight.

3. The hollow expansion balls of this invention are foamed by physical process, which is not affected in a foaming process. In addition, since the hollow expansion balls are made of the same thermoplastic resin as the principal material of this invention; therefore, when the thermoplastic resin foamed products are used for a period of time and have to be discarded or replaced, these foamed thermoplastic products unusable, can be recycled, directly smashed to be used as regenerative materials, unnecessary to select and classify but only necessary to directly have them heated and melted to be reclaimed. On the whole, it is easy and convenient to reclaim and regenerate discarded foamed thermoplastic resin products, conducive to environmental protection. Moreover, in a foaming process, no harmful gas is added to the thermoplastic resin, thus not only insuring safety of the workers but also lowering environment pollution.

While the preferred embodiment of the invention has been described above, it will be recognized and understood that various modifications may be made therein and the appended claims are intended to cover all such modifications that may fall within the spirit and scope of the invention.

I claim:

1. A method for producing an environment protective thermoplastic resin polymer, comprising using an extruder and a helical rod to be driven to rotate, said extruder having a feeding section, a melting section, a mixing section and a heating-shaping section formed therein, characterized in that:
    thermoplastic resin is heated and melted within said melting section and then moved in said mixing section, and foamable hollow expansion balls in a preset proportion to said thermoplastic resin are added into said mixing section to be evenly mixed with said melted thermoplastic resin therein, and said hollow expansion balls are slight heated, foamed and inflated in said mixing section, then moved into said heating shaping section to be heated and foamed by comparatively high temperature to be inflated to an preset size, said thermoplastic resin and said hollow expansion balls are shaped into a foamed thermoplastic resin polymer after being cooled;
    wherein said extruder is provided with a motor at one side thereof for driving a helical rod to rotate, said helical rod lengthwisely installed in an interior of said extruder, said method comprises:
    step 1: feeding said thermoplastic resin into said extruder through a material intake provided above said feeding section at a front end of said extruder;
    step 2: pushing said thermoplastic resin by using said helical rod into said melting section through said feeding section, wherein said thermoplastic resin is heated and melted by heating members disposed around said melting section, and gas is exhausted out of an exhaust hole provided above said melting section during said thermoplastic resin is heated and melted;
    step 3: feeding hollow expansion balls into said extruder through a material feeding hole positioned above a connecting portion of said melting section and said mixing section that is connected with a rear end of said melting section, wherein said thermoplastic resin and said hollow expansion balls are melted and stirred together by said helical rod;
    step 4: moving said melted thermoplastic resin and said microfoamed hollow expansion balls forward to pass through a filter screen vertically disposed at the rear end of said mixing section and having numerous meshes, wherein flow amount and flow speed of said melted thermoplastic resin and said micro-foamed hollow expansion balls are controlled by the meshes of said filter screen to produce a backward pressure toward said mixing section, said thermoplastic resin and said microfoamed hollow expansion balls are stirred and mixed evenly for a comparatively long time by said filer screen; and
    step 5: moving said thermoplastic resin and said hollow expansion balls into said heating-shaping section after finishing said step 4 to pass through said filter screen, wherein said hollow expansion balls are heated, foamed and inflated at a rate under control in said heating-shaping section, said thermoplastic resin and said hollow expansion balls pass through a shaping nozzle connected with a rear end of said heating-shaping section and are shaped into a foamed thermoplastic resin polymer with a preset thickness and shape after being cooled.

2. The method for producing an environment protective thermoplastic resin foamed polymer as claimed in claim 1, wherein said filter screen has 20-200 meshes and its rear side is fixed with a support plate having small holes formed on a surface of the support plate, and each small hole has a size between 1.5 mm and 15 mm.

3. The method for producing an environment protective thermoplastic resin foamed polymer as claimed in claim 1, wherein an amount ratio between said thermoplastic resin and said hollow expansion balls is 8:2 or 9:1.

4. The method for producing an environment protective thermoplastic resin foamed polymer as claimed in claim 1, wherein said hollow expansion ball is made of thermoplastic resin.

5. The method for producing an environment protective thermoplastic resin foamed polymer as claimed in claim 1, wherein an outer diameter of each hollow expansion ball is between 5 µm and 50 µm, and an interior of each hollow expansion ball is filled with a core composed of a compound of carbon and hydrogen, and a thickness between the outer diameter of said hollow expansion ball and an outer diameter of said core is 2-12 µm.

6. The method for producing an environment protective thermoplastic resin foamed polymer as claimed in claim 1, wherein the foaming rate of said hollow expansion balls is in a scope of 2 times to 50 times.

7. The method for producing an environment protective thermoplastic resin foamed polymer as claimed in claim 1, wherein a melting point of said hollow expansion balls is higher than that of said thermoplastic resin.

8. The method for producing an environment protective thermoplastic resin foamed polymer as claimed in claim 1, wherein said helical rod of said extruder is a doublehelical rod.

9. The method for producing an environment protective thermoplastic resin foamed polymer as claimed in claim 1, wherein said helical rod of said extruder is a single helical rod.

10. The method for producing a thermoplastic resin foamed polymer as claimed in claim 1, wherein said thermoplastic resin foamed polymer is formed in a bar shape, and then a bar-shaped thermoplastic resin foamed polymer is cut into grains.

11. The method for producing an environment protective thermoplastic resin foamed polymer as claimed in claim 1, wherein said thermoplastic resin or said hollow expansion balls before being added into said extruder is mixed with metallic powder in a preset proportion to let a finished foamed thermoplastic resin foamed polymer spread with said metallic powder.

* * * * *